United States Patent
Federspiel et al.

(10) Patent No.: US 12,423,572 B2
(45) Date of Patent: Sep. 23, 2025

(54) OPTIMAL CONTROL WITH DEEP LEARNING

(71) Applicant: Vigilent Corporation, Oakland, CA (US)

(72) Inventors: Clifford C. Federspiel, El Cerrito, CA (US); Peter C. Varadi, El Cerrito, CA (US)

(73) Assignee: Vigilent Corporation, Oakland, CA (US)

( * ) Notice: Subject to any disclaimer, the term of this patent is extended or adjusted under 35 U.S.C. 154(b) by 796 days.

(21) Appl. No.: 17/014,833

(22) Filed: Sep. 8, 2020

(65) Prior Publication Data

US 2021/0073636 A1    Mar. 11, 2021

Related U.S. Application Data

(60) Provisional application No. 62/897,135, filed on Sep. 6, 2019.

(51) Int. Cl.
  *G06N 3/08* (2023.01)
  *G06N 3/04* (2023.01)

(52) U.S. Cl.
  CPC .............. *G06N 3/08* (2013.01); *G06N 3/04* (2013.01)

(58) Field of Classification Search
  None
  See application file for complete search history.

(56) References Cited

U.S. PATENT DOCUMENTS 9,020,647 B2 * 4/2015 Johnson .................. F24F 11/62
                                                700/277
10,439,912 B2 * 10/2019 Ghosh .................. H04L 41/145
(Continued)

FOREIGN PATENT DOCUMENTS

WO     2019157602        8/2019

OTHER PUBLICATIONS

"Expresso: A User-Friendly GUI for Designing, Training and Exploring Convolutional Neural Networks," arXiv, Oct. 18, 2015, Sarvadevabhatla et al; Sarvadevabhatla. (Year: 2015).*
(Continued)

*Primary Examiner* — Michael J Huntley
*Assistant Examiner* — Paul J Breene
(74) *Attorney, Agent, or Firm* — Kilpatrick Townsend & Stockton LLP

(57) ABSTRACT

Embodiments provide a machine learning model to identify changes in setpoints of one or more environmental control modules that, while having a high critical error, provide greater reductions in a cost function associated with the one or more environmental modules provided in an environmentally controlled space. The high critical error associated with the identified changes may still be within an acceptable threshold range associated with the environmentally controlled space. Thus, contrary to rule-based methods, the artificial intelligence (AI) based model described herein may recommended optimal changes to the system that yield to greater savings in the cost function and may not focus on minimizing the critical control error. Rather, the AI-based technique may simply aim at keeping the critical control error within an acceptable threshold range.

20 Claims, 5 Drawing Sheets

(56) References Cited

U.S. PATENT DOCUMENTS

| | | | |
|---|---|---|---|
| 11,648,504 B2* | 5/2023 | Kim | B01D 53/0454 |
| | | | 95/11 |
| 2012/0259469 A1* | 10/2012 | Ward | G05D 23/1917 |
| | | | 700/276 |
| 2015/0012144 A1* | 1/2015 | Wang | H02J 3/32 |
| | | | 700/291 |
| 2016/0201934 A1 | 7/2016 | Hester et al. | |
| 2018/0173372 A1* | 6/2018 | Greenspan | G06F 16/2465 |
| 2018/0267701 A1 | 9/2018 | Rigg et al. | |
| 2018/0299840 A1* | 10/2018 | Sinha | G05B 13/0265 |
| 2020/0265301 A1* | 8/2020 | Burger | G06N 3/084 |
| 2020/0337625 A1* | 10/2020 | Aimone | A61B 5/7267 |

OTHER PUBLICATIONS

"Recommender System," Wikipedia (Year: 2023).*
"Loss function," Wikipedia (Year: 2023).*
"Unsupervised learning," Wikipedia (Year: 2020).*
"Recommender Systems," Wikipedia (Year: 2020).*
PCT/US2020/049762, "International Search Report and Written Opinion", Nov. 30, 2020, 9 pages.

* cited by examiner

OPTIMAL CONTROL WITH DEEP LEARNING

CROSS-REFERENCES TO RELATED APPLICATIONS

This application claims benefit under 35 USC § 119(e) to U.S. Provisional Patent Application No. 62/897,135 filed Sep. 6, 2019 and entitled "Optimal Control With Deep Learning", the disclosure of which is incorporated by reference herein in its entirety for all purposes.

BACKGROUND

Often times, values of physical conditions, such as temperature and humidity, of a space (e.g. homes, buildings, offices, computer rooms of data centers that contain large arrays of computers and servers) are controlled. To control the physical conditions, the space is provided with devices, including sensors and environmental maintenance modules, or just modules, capable of modifying one or more of the physical conditions. The modules have one or more adjustable components termed environmental actuators, or just actuators, which control how the modules operate.

Manufacturers typically provide environmental maintenance modules as integral units with built-in controllers and externally accessible and/or adjustable setpoints for the actuators. These modules are installed in the space to be environmentally controlled, or at least are functionally connected to that space, for example by ductwork. The setpoints are values that are selected by an administrator (such as personnel, the data center operations personnel, owner, decision maker, equipment installer, or similar) to control the physical conditions in the managed space. The environmentally controlled space may include one or more sensors that read/measure values of one or more physical conditions and compare the readings/measurements to the setpoints of the actuators.

A computer controlling the space or an administrator may modify the setpoints to best maintain desired physical conditions in the managed space. The changes to the setpoints may impact a cost function associated with the controlled space. Current techniques may provide alternative changes to the setpoints that will reduce the cost function. However, the alternative changes provided by the current techniques also aim at minimizing a critical control error and therefore do not consider changes resulting in higher reductions in the cost function that are associated with higher critical control error.

SUMMARY

Embodiments provide a method performed by a computer system. The method includes receiving historic data associated with an environmental controlled space over a period of time. The historic data includes data associated with a plurality of environmental maintenance modules provided in the environmentally controlled space or data associated with one or more environmental factors affecting the environmentally controlled space. The historic data is grouped based on one or more predetermined parameters into grouped historic data. The method includes executing a deep learning model with a first portion of the grouped historic data. The deep learning model is trained using a second portion of the grouped historic data. The method further includes predicting, based on executing the deep learning model, a first set of changes in one or more state variables associated with the plurality of environmental maintenance modules within a future time interval and a second set of changes in a cost function associated with the plurality of environmental maintenance modules within the future time interval. The method also includes determining, based on executing the deep learning model, a recommended modification in the one or more state variables associated with the plurality of environmental maintenance modules resulting in an optimal change in the cost function associated with the plurality of environmental maintenance modules. The method includes generating a visual representation of the first set of changes, the second set of changes, and the recommended modification with respect to a predetermined tolerance threshold range; and outputting the visual representation to a display device.

Embodiments further provide a computer product comprising a non-transitory computer readable medium storing a plurality of instructions that, when executed, cause a computer to perform the method described above.

The plurality of instructions, when executed, further cause the computer to generate a graphical user interface including the visual representation. The graphical user interface may receive an input from a user. In some embodiments, the instructions, when executed, cause the computer to receive, via the graphical user interface, one or more user-selected constraints; and determine the recommended modification within the one or more user-selected constraints. In some embodiments the instructions, when executed, cause the computer to receive, via the graphical user interface, an instruction to apply the recommended modification; and apply the recommended modification to the environmentally controlled space.

Embodiments also provide an environmental maintenance system comprising a plurality of environmental maintenance devices; a computer that is communicatively linked with the plurality of environmental maintenance devices, and the computer product described above, and that is configured to execute the plurality of instructions of the computer product; and a display device communicatively linked with the computer for displaying the visual representation generated by the computer.

These and other embodiments of the disclosure are described in detail below. For example, other embodiments are directed to systems, devices, and computer readable media associated with methods described herein.

DETAILED DESCRIPTION

Figure 1:
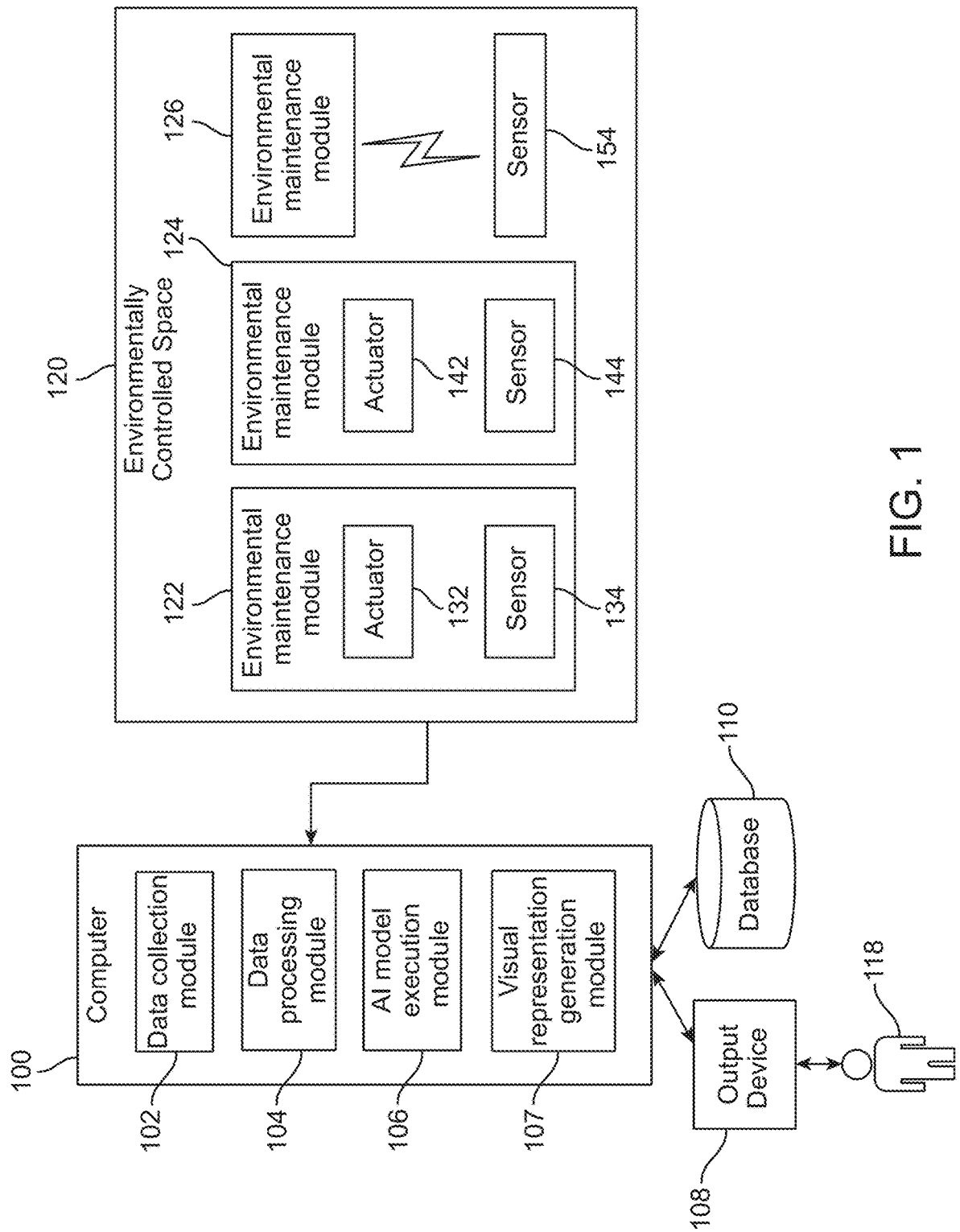
FIG. 1 illustrates a block diagram of a system for controlling an environmentally controlled space, according to an embodiment of the present disclosure.

Embodiments use a machine learning model to identify changes in setpoints of one or more environmental control modules that, while having a high critical control error, provide greater reductions in a cost function associated with the one or more environmental modules provided in an environmentally controlled space. The high critical control error associated with the identified changes may still be within an acceptable threshold range associated with the environmentally controlled space. Thus, contrary to rule-based methods, the artificial intelligence (AI) based model described herein may recommended optimal changes to the system that yield to greater savings in the cost function and may not focus on minimizing the critical control error. Rather, the AI-based technique may simply aim at keeping the critical control error within an acceptable threshold range. Thus, techniques described herein provide an advantage over the conventional systems by providing greater savings on the cost function (e.g. savings of cost, power, resources). The savings on the cost function reduce the power and resource consumption, therefore providing for a more environmental-friendly solution that reduces greenhouse gas emissions, conserves energy and resources.

According to various embodiments, a sensor (e.g. thermostat) may have an upper and lower thresholds (e.g. a setpoint with a deadband on a thermostat defines two thresholds). A control error for that sensor may refer to the signed difference between the current value and the nearest threshold. If the system includes a plurality of sensors, the control errors are aggregated into a single critical control error. In some embodiments, the critical control error may be the control error of one or more sensors that most exceed one of their two thresholds on the outside of the allowable range. In other embodiments, the control errors for multiple sensors may by aggregated according to other aggregating functions. A critical control error of zero implies that one or more sensors is exactly at one edge of their respective allowed setpoint range and all other sensors have values that lie within their respective allowed setpoint ranges.

The machine learning model (e.g. a deep learning model) may model an impact of changes to environmental maintenance system setpoints (e.g. static pressure setpoint, supply air temperature setpoint) on changes in the overall (e.g. total) cost function associated with the environmental control modules (e.g. fans, chiller plant, boiler) in a future time frame (e.g. 15-minutes into the future). The machine learning model may also model an impact of the same environmental maintenance system setpoints on the difference between the temperature of the critical (e.g., hottest or coldest) space and the allowable (e.g. predetermined) upper or lower limit in the future. The machine learning may also model an impact of changes in exogenous variables (e.g., outdoor temperature, solar radiation) on the cost function associated with the controlled space and proximity of critical temperature to the predetermined limit(s) in the future. The machine learning model may be used to operate the environmental maintenance system with maximum efficiency.

I. Environmentally Controlled Space

Often enclosed physical spaces need to have various physical conditions maintained within certain desired ranges. Examples of such spaces include individual rooms, entire floors of an office building and computer server rooms at data centers. Examples of such physical conditions include temperature, pressure and humidity, pollution or pathogen levels, among others.

FIG. 1 illustrates an exemplary environmental maintenance system, according to various embodiments. The exemplary environmental maintenance system may include an environmentally controlled space 120 comprising a plurality of environmental maintenance devices, a computer 100 communicatively linked with the plurality of environmental maintenance devices, and a display device 108 communicatively linked with the computer 100.

The plurality of environmental maintenance devices include environmental maintenance modules 122, 124, 126 (e.g. air handling units (AHUs), air conditioners (AC), cooling devices, HVAC units, variable air volume (VAV) boxes, Computer Room Air Conditioners (CRACs)), and sensors (such as sensor 154). Exemplary environmental maintenance modules 122, 124 may each include an actuator 132, 142 (e.g. a fan, a valve, a pump) and a sensor 134, 144 (e.g. a temperature sensor, a humidity sensor, a pressure sensor). The actuators 132, 142 may each control a flow (e.g. air flow) through the respective module 122, 124. The modules 122, 124 have various adjustable components, such as fan speeds or valve settings, that function to affect the physical conditions. These components are controlled by values of actuators 132, 142, such as a voltage setting on a fan or a turn setting on a valve. The environmental maintenance modules 122, 124 may include a controller that controls actuator state variables in response to the sensor value (e.g. to keep sensor value near a desired value).

An adjustable setting of an actuator is termed a 'control variable.' Examples of control variables include fan voltages and valve settings; the term 'actuator value' is used herein to refer to specific values of control variables. Actuator values may include Boolean values, including 'on' or 'off', real number values, hexadecimal values, percent of a possible range (e.g. 50% for valve opening) or other forms of data values. When it is clear from context, the terms 'control variable' and 'actuator value' may be used interchangeably.

Other exemplary environmental maintenance modules (such as environmental maintenance module 126) may not include an actuator and/or a sensor. The environmental maintenance module 126 may be configured to change its supply air flow/properties in response to environmental sensor readings of external sensors (such as sensor 154) that are associated with the environmental maintenance module 126 in a programmatic way. The standalone sensor 154 is an environmental maintenance device that is configured to measure a physical property of the environmentally controlled space 120 or other environmental maintenance devices such as the environmental maintenance module 126.

A computer 100 may be communicatively linked with some or all of the sensors 134, 144, 154 and/or actuators 132, 142 in the environmentally controlled space 120. The computer 100 may include a general purpose computer, an application specific integrated circuit (ASIC) or a field programmable gate array (FPGA). The computer 100 may be communicatively coupled to a display device 108 that may display a user interface (UI) through which a user 118 may the setpoints associated with the environmental maintenance modules to best maintain desired physical conditions in the controlled space 120.

For example, the user 118 (or a controller computer) can control a temperature and a static pressure of one or more of the environmental maintenance modules 122, 124, 126. For example, the user 118 may set the setpoint of a first environmental maintenance module 122 at 58° F. and the static pressure at about 165 Pa. These settings will adjust a valve of the first environmental maintenance module 122 to move water through a cooling coil in order to make the supply temperature stay close to 58° F., and adjust the speed of the fan of an air handler associated with the first environmental maintenance module 122 in order to achieve the desired static pressure.

According to various embodiments, the computer 100 may receive, via data collection module 102, historic data associated with the environmental controlled space 120 over a period of time. The historic data may include data associated with the environmental maintenance modules 122, 124, 126 such as values of the setpoints, actuator state variables, sensor readings (e.g. temperature, static pressure, humidity) associated with the environmental maintenance modules 122, 124, 126. The historic data may also include environmental factors affecting the environmentally controlled space 120 such as the external air temperature, the solar radiation, the weather data over the period of time. The computer 100 may store the received historic data in a database 110.

The computer 100 may process the historic data using data processing module 104, and use the processed historic data to train a machine learning model. The trained machine learning model, when executed on an AI model execution module 106, may predict the impact of change in state variables associated with the environmental maintenance modules on the cost function associated with the controlled space 120 (or the environmental maintenance modules). In some embodiments, the computer 100 may provide recommended modifications to the user that may result in a lower cost function. For example, in the example provided above the user wanted to set the first environmental maintenance module 122 at 58° F. and the static pressure at about 165 Pa. The computer 100 may recommend a temperature and/or pressure setpoint that is slightly different than the user's desired setpoint, that would result in a lower cost function. The recommended setpoint may be within an allowable range (e.g. within an acceptable critical control error range associated with the controlled space 120 or the environmental maintenance module). According to various embodiments, the recommended change may yield an optimal change in the cost function associated with the plurality of environmental maintenance modules.

The computer 100 may then communicate the recommended change(s) to the user. For example, the computer 100 may generate, via visual representation generation module 107, a visual representation (e.g. a table, a graph, a map, a message including alphanumerical characters and/or symbols) of the determined recommended change(s). In some embodiments, the computer 100 may receive, for example via a user interface displayed on the display device 108, an input selecting one of the recommended change(s). The computer 100 may then apply the selected recommended change to the environmentally controlled space 120 and continue receiving historic data from the environmentally controlled space 120, now running with the selected recommended change.

II. Processing Historic Data using a Machine Learning Model

As described above, the computer 100 receives historic data associated with the environmentally controlled space 120 from the environmental maintenance modules 122, 124, 126 and/or sensors 134, 144, 154 provided in the environmentally controlled space, as well as other sources that provide the exogenous variables (e.g., outdoor temperature, solar radiation).

Figure 2:
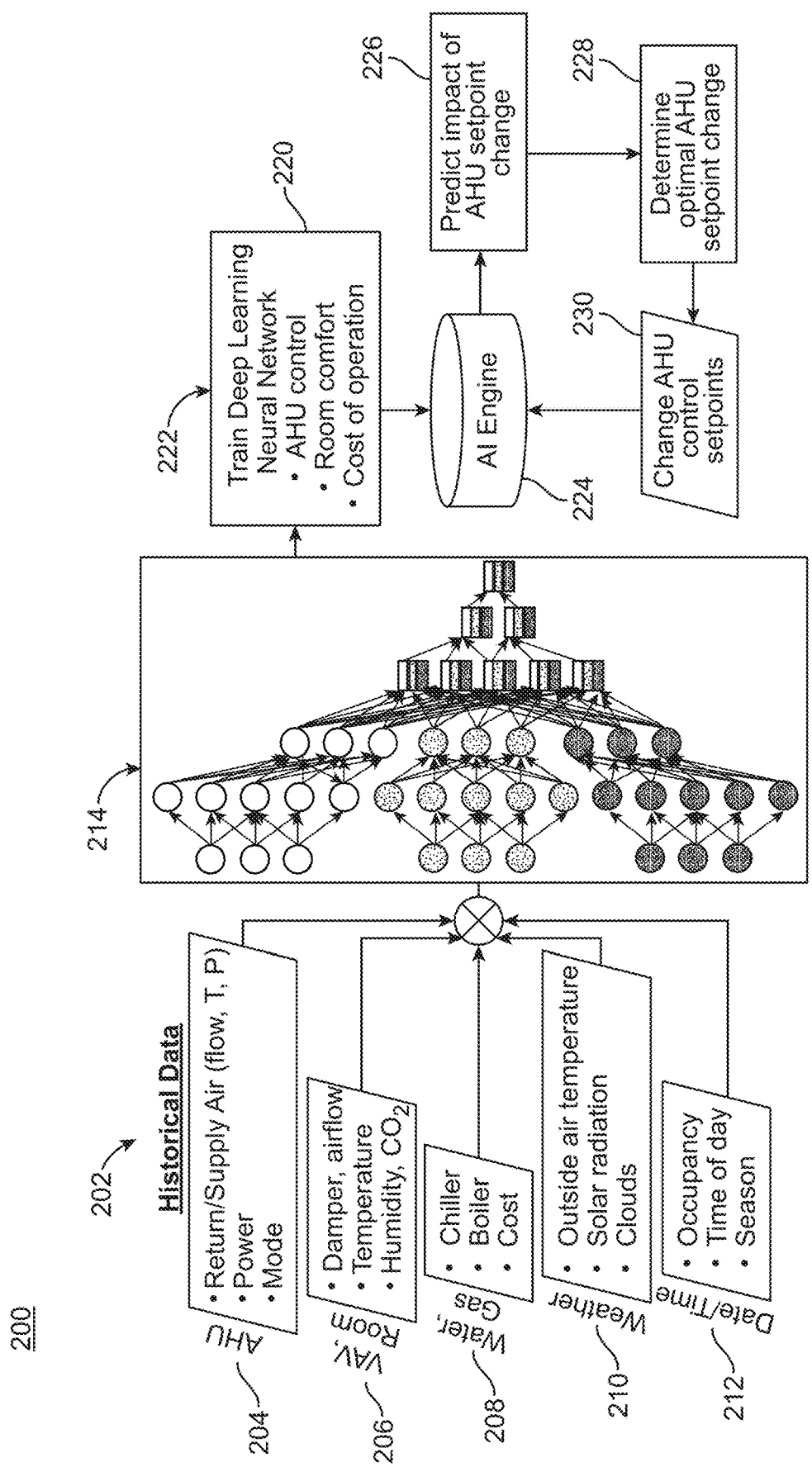
FIG. 2 illustrates a computer system including an artificial intelligent (AI) engine for training and executing a machine learning model using historic data associated with an environmentally controlled space, according to embodiments of the present disclosure.

As shown in FIG. 2, the historic data 202 may include first set of data 204 from air handling units supplying air to the environmental maintenance modules in an environmentally controlled space (e.g. return/supply air flow, temperature, pressure; power; mode), second set of data 206 from the environmental maintenance modules placed in various locations within the environmentally controlled space (e.g. damper positioning, airflow, temperature, humidity, $CO_2$), third set of data 208 associated with a power source of the environmental maintenance modules (e.g. chiller, boiler, operational and maintenance costs), weather data 210 (e.g. outside air temperature, solar radiation, cloud coverage in the sky), and time data 212 (e.g. occupancy of the controlled space, time of day, season).

The historic data 202 may then be provided to a data processing module 214 for processing. According to various embodiments, the data processing module 214 may group the historic data 202 based on predetermined parameters. For example, the data processing module 214 may group the historic data based on types of environmental maintenance modules, by location, by energy source, etc. In some embodiments, the user may determine/select the predetermined parameters. The historic data 202 may be grouped in many different ways, based on different sets of parameters. Techniques described next may be repeated for any number of groupings of the historic data 202 to determine an optimal output.

The computer system 200 may then use the processed, grouped data 220 to train a machine learning model 222 (e.g. a deep learning neural network). According to various embodiments, the grouping of the historic data 202 based on the parameters (e.g. user-selected or otherwise predetermined) may influence and/or guide the learning of the machine learning model 222. In some embodiments, a first portion (e.g. input data) of the grouped historic data may be used to execute the machine learning model 222 and a second portion (e.g. training data) of the grouped historic data may be used to train the machine learning model 222. For example, the second portion of the grouped historic data may be older than the first portion of the grouped historic data. In some embodiments, historic data older than a predetermined threshold (e.g. 1 week, few days, a day, few hours) may be used as training data set, and historic data newer than the predetermined threshold 221 may be used as input data to the artificial intelligence (AI) engine 224 executing the trained machine learning model. For example, the input data may be a few seconds old, a few minutes old or a few hours old. According to various embodiments, the AI engine 224 may be a part of the computer 100 illustrated in FIG. 1.

When there is not yet enough historic data to train the machine learning model, the AI engine 224 may rely on preconfigured control methods (e.g. a proportional-integral-derivative (PID) control) for making a satisfactory prediction using the available amount of historic data 202. When enough amount of historic data is received from the environmental maintenance modules, the AI engine 224 may switch in part, gradually or in whole, to running the machine learning model trained on the historic data.

The AI engine 224 may generate a set of predictions 226. The AI engine 224 may predict a set of changes (e.g. changes in one or more state variables) associated with the environmental maintenance modules in the controlled space in a future time interval (e.g. next 15 minutes, next hour). For example, the AI engine 224 may predict the supply air temperature changes and static pressure changes in connection with one or more of the environmental maintenance modules and/or the controlled space. The AI engine 224 may also predict a set of changes in a cost function associated with the environmental maintenance modules in the controlled space in the same future time interval. The AI engine 224 may also predict an impact of the changes in the one or more state variables associated with the plurality of environmental maintenance modules on the cost function. For example, the AI engine 224 may indicate that increasing the supply air temperature by X amount will increase the cost function by Y amount.

Figure 3:
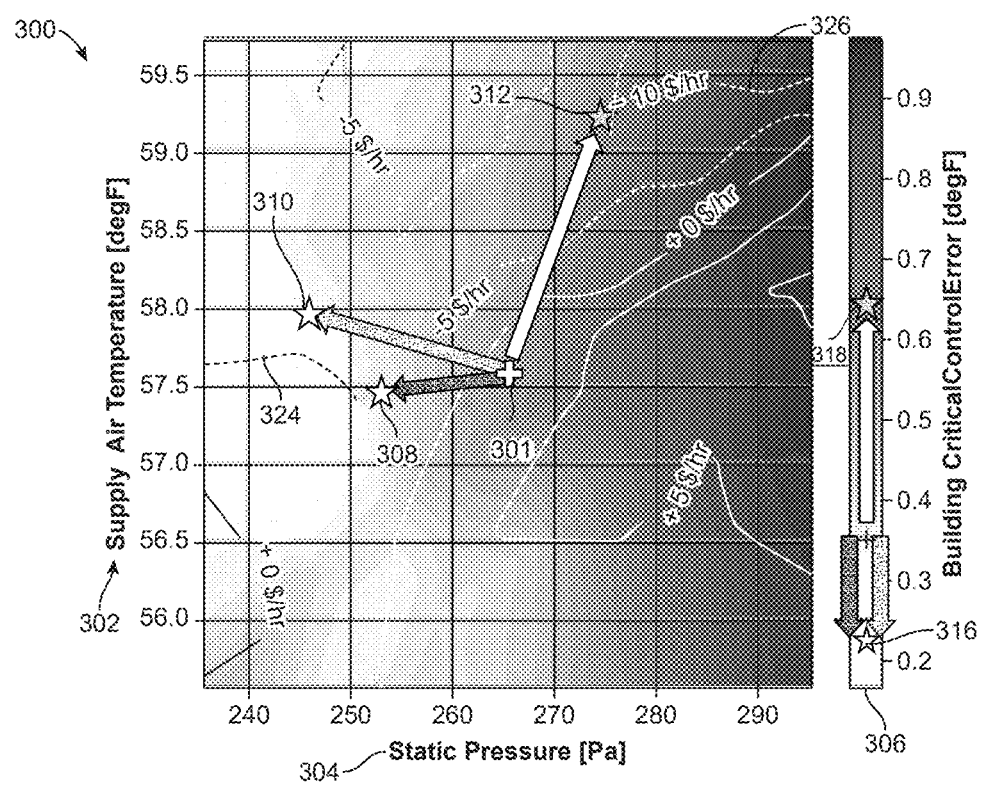
FIG. 3 illustrates an exemplary visual representation showing recommended modifications determined using the computer system of FIG. 2, according to embodiments of the present disclosure.

Based on these predictions 226, the AI engine 224 may determine one or more recommended modifications in the state variables that result in an optimal change in the cost function. For example, the AI engine 224 may recommend increasing the supply air temperature by X±error, which yields an increase in the cost function by less than Y amount, or better yet, which yields to a decrease in the cost function by Z amount. The error may be within the building's predetermined critical control error range (e.g. predetermined tolerance threshold range). For example, the AI engine 224 may determine that decreasing the present temperature of a room by 0.5 degrees may result in a $5 savings in the heating cost. However, the AI engine may recommend increasing the temperature by 1.5 degrees while also increasing the static pressure of the room by 10 Pa, which results in $10 savings in the heating cost. The increases recommended by the AI engine may still be within the critical control error rate associated with the room. For example, the critical control error may allow for higher or lower setpoints by predetermined amounts (e.g. critical control error rate) which does not significantly change the comfort level otherwise provided by the desired setpoints. These changes and the recommended modification(s) are illustrated in FIG. 3, and discussed below in greater detail in connection with FIG. 3.

When the AI engine 224 determines the recommended modifications, the recommended modifications may be communicated to the user, for example by being displayed on a display device. The user (or the computer system) may select one of the recommended modifications or may select another modification. Upon receiving the instruction to apply the recommended modification, the AI engine 224 may receive the new control setpoints as an input 230, and run the machine learning model once again with the new input.

According to various embodiments, the machine learning model may forecast (predict) the cost function (e.g. cost of power) as well as the impact of the changes on the cost function. The machine learning model may use historic data from all environmental maintenance modules, and may predict the change in at least one of the modules that is closest to its setpoint. A difference between the setpoint and the temperature of a module is called the control error.

In some embodiments, the user may provide a set of constraints to the AI engine 224 for executing the machine learning model. The recommended modifications determined by the AI engine 224 may be within the user-selected constraints. That is, the user may further influence or customize the output of the AI engine 224.

According to various embodiments, the computer system may provide a graphical user interface (GUI) to the user for the user to provide inputs, such as parameters for the processing engine to group the historic data, constraints for the AI engine, etc. The user may also select the recommended modification or any other modifications via the GUI.

III. Recommended Modification(s)

According to embodiments, the AI engine 224 may determine recommended modifications based on preconfigured control data (in the absence of meaningful amount of historic data) or the AI engine 224 may determine recommended modifications based on executing a machine learning model trained on historic data (when there is meaningful amount of historic data, e.g. enough to train and execute the machine learning model). Once determined, the recommended modification(s) may be communicated to the user via, for example, a visual representation (e.g. in form of a graph, table, text, and with using a variety of visual cues). The computer 100 may generate the visual representation of the predicted changes (e.g. changes in one or more state variables associated with the environmental maintenance modules in the controlled space in a future time interval, and changes in a cost function associated with the environmental maintenance modules in the controlled space in the same future time interval) and the recommended change(s) with respect to a predetermined tolerance threshold range. The visual representation may be output to a display device. FIG. 3 illustrates an exemplary visual representation in form of a graphical representation 300 according to various embodiments.

In the graphical representation 300, the vertical axis 302 represents a first state variable (e.g. the supply air temperature), and the horizontal axis 304 represents a second state variable (e.g. the static pressure) associated with an environmentally controlled space. A representation of the critical control error 306 of the controlled space is provided next to the graphical representation 300. In the exemplary embodiment illustrated in FIG. 3, the critical control error (e.g. predetermined tolerance threshold) 306 is shown as a color gradient along with error values corresponding to each gradient. The critical control error may be difference between the allowable space temperature limit and the temperature of the critical space. For a given environmental maintenance module, the critical control error may represent a difference between a set point and an actual value of a state variable associated with the environmental maintenance module. As shown in FIG. 3, the color gradient representing the critical control error is also overlaid on the graphical representation 300. The graphical representation 300 further includes contours 324 (e.g. non-linear contours) representing changes in the cost function associated with the environmental maintenance module(s) in the controlled space for changes in the horizontal and vertical axes relative to the status quo represented by the cross 301.

The graphical representation 300 illustrates the changes to the first state variable, the changes to the second state variable, and the changes to the cost function. For example, the current state of the controlled space may be illustrated with the cross 301. Changing (e.g. lowering) the supply air temperature to below 57.5° F. and changing (e.g. lowering) the static pressure to below 255 Pa, results in a first modification 308. The first modification is on the "−5 $/h" cost function contour. Accordingly, the first modification yields to a reduction in the cost function of about 5 $/h in a future time interval (e.g. about 15 minutes later). For example, the first modification 308 may be determined using a preconfigured control method that does not rely on the machine learning model.

Using the machine learning model trained with historic data according to techniques described herein, a second modification 310 may be determined. The AI engine may execute the machine learning model trained using the grouped data, and may determine that the second modification 310. The second modification 310 may change (e.g. increase) the supply air temperature to 58° F. and change (e.g. lower) the static pressure to about 245 Pa, and yield to a higher reduction in the cost function than the first modification. The critical control error for both the first modification 308 and the second modification 310 is on the low end of the allowable range (about 0.2, illustrated as the white zone). The second modification 310 determined using a machine learning model trained with historic data is a better modification than the first modification 308 determined using preconfigured control methods because the second modification yields to higher savings (e.g. cost, resources) while remaining in the same critical control error range.

According to various embodiments, the AI engine may determine a third modification 312. The third modification 312 may change (e.g. increase) the supply air temperature to above 59° F. and change (e.g. increase) the static pressure to about 275 Pa, and yield to a reduction in the cost function of about 10 $/h in the future time interval (e.g. 15 minutes later). While the critical control error 318 for the third modification 312 (e.g. about 0.6) is higher than the critical control error 316 for the first modification 308 and the second modification 310 (e.g. about 0.2), the critical control error 318 for the third modification 312 is still within the allowable range of critical control error 306. Accordingly, the third modification 312 is an acceptable modification within the given parameters. Conventional control methods aim to determine the best modification that will result in cost savings (where possible) while reducing the critical control error. However, the trained machine learning model described herein is configured to identify better modifications (e.g. higher power, cost and resource savings) that may increase the critical control error while remaining within an allowable threshold range. Accordingly, the third modification 312 would be the recommended modification by the AI engine. According to various embodiments, all three modifications may be presented to the user, and the user may select the desired modification. In some embodiments, an environmental maintenance system may automatically select the recommended modification by the AI engine.

In some embodiments, the user may provide expected output criteria as an input to the AI engine to guide the generation of the visual representation. For example, in the exemplary graph illustrated in FIG. 3, the user may provide the expected gradient layout to the AI engine, and the AI engine may tailor the learning of the machine learning model based on the user input.

In some embodiments, the user may expect at least one of the graphical elements representing the changes in the state variables, the changes in the cost function, the critical control error or the recommended modification(s) to be in a selected graphical shape or type. For example, the user may expect the contour lines 324 to be of a certain graphical type (e.g. saddle curve). If the user provides the expected graphical type to the AI engine (e.g. via the GUI), or if the expected graphical type is preconfigured, the AI engine may tailor the learning of the machine learning model accordingly and may generate a graph including a saddle curve to illustrate the contour lines 324. When the user provides a selected graphical shape or type to the AI engine, the AI engine may execute the machine learning model with the grouped historic data and the selected graphical shape or type. The generated graph will include at least one element (or the graph itself will be) in the selected or preconfigured shape/type. In some embodiments, this approach may help to eliminate the noise in the historic data.

As shown in FIG. 3, one or more of the changes in the state variables, the changes in the cost function, the critical control error and the recommended modification(s) may be illustrated with visual cues, including but not limited to, color, shapes, shading, symbols, transparency, etc.

IV. Exemplary Method for Generating Recommended Modification(s)

Figure 4:
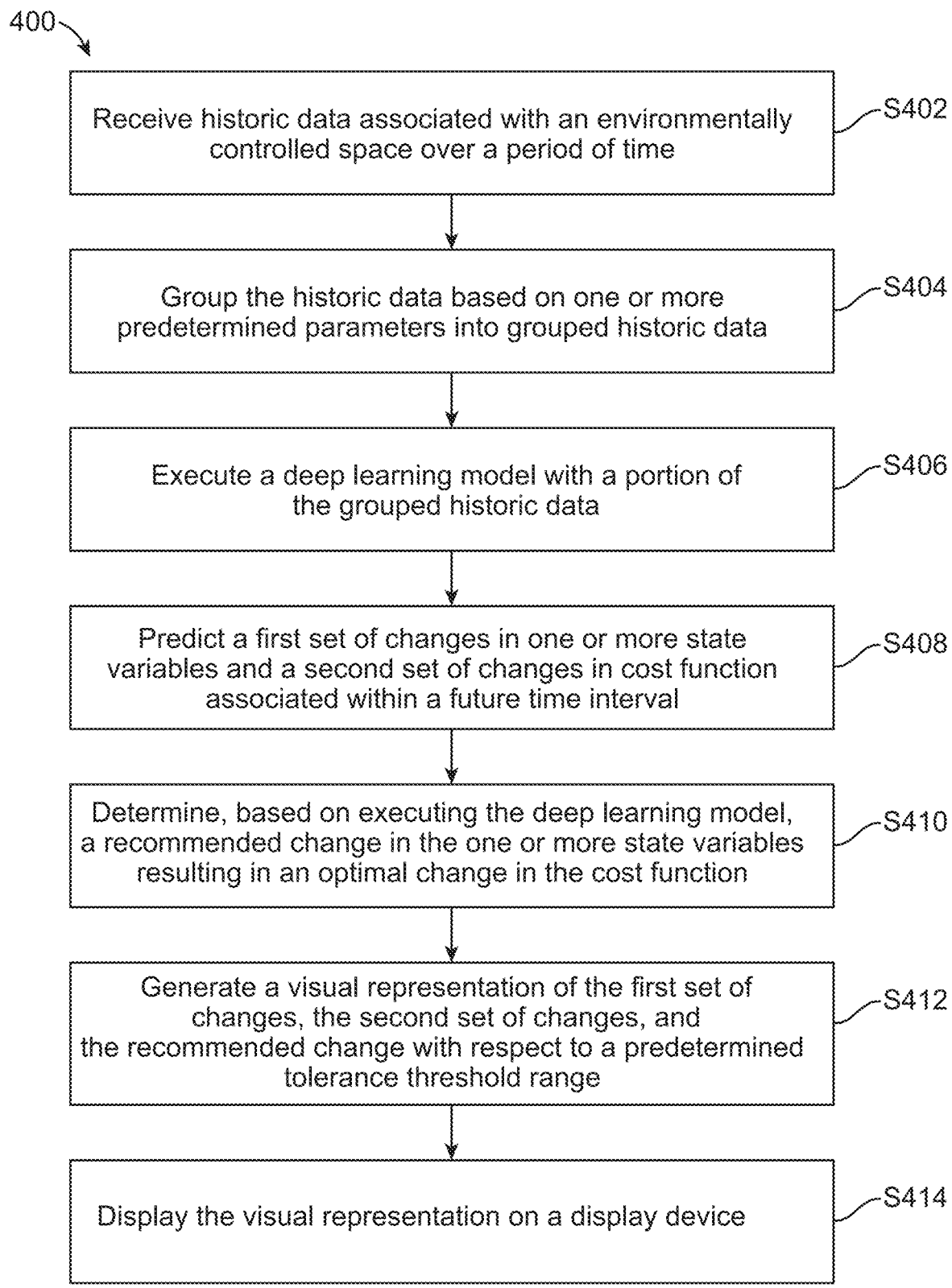
FIG. 4 is a flow chart of a method of generating recommended modifications, according to an embodiment of the present disclosure.

FIG. 4 illustrates a flow chart of a method of generating recommended modification(s), according to an embodiment of the present invention.

A computer may be coupled to a plurality of environmental maintenance devices provided in an environmentally controlled space. At step S402, the computer may receive historic data associated with the environmentally controlled space. The historic data may include data associated with the plurality of environmental maintenance devices, such as a temperature and a static pressure, over a period of time. The historic data may further include data associated with one or more environmental factors affecting the environmentally controlled space such as external air temperature, solar radiation, and/or weather data, over the period of time.

At step S404, the computer may process the data including, for example, grouping the historic data based on predetermined parameters. The predetermined parameters may be selected by the user, pre-programmed in the computer or automatically selected by the computer among a list of parameters. A portion of the grouped data may be used to train a machine learning model (e.g. a second portion of the grouped historic data that is older than a first portion of the grouped historic data). The grouping of the data, hence the parameters, guide the learning of the machine learning model. Various groupings may be available and applicable to the same historic data. According to various embodiments, the machine learning model may be trained using different groupings. For example, in the case of a deep neural network model, subnetworks may be formed with different groupings of the historic data.

At step S406, the computer can execute the trained machine learning model with another portion of the grouped historic data (e.g. using the first portion of the grouped historic data that is newer that the second portion of the grouped historic data). According to various embodiments, the machine leaning model may include a deep learning model which is trained using older historic data (e.g. data that is fee minutes old, few hours old, few days old or a week old) associated with the environmentally controlled space. Newer historic data (e.g. few seconds old, few minutes old) may be used as input to the deep learning model.

At step S408, the computer may predict, based on executing the machine learning model, a first set of changes in one or more state variables associated with the plurality of environmental maintenance modules within a future time interval. For example, the machine learning model may predict a change in the supply air temperature and the static pressure associated with an environmental maintenance module. The machine learning model may also predict a second set of changes in a cost function associated with the plurality of environmental maintenance modules within the same future time interval.

According to various embodiments, the computer may also predict an impact of the first set of changes in the one or more state variables associated with the plurality of environmental maintenance modules on the cost function.

At step S410, the computer may determine, based on executing the machine learning model, a recommended modification in the one or more state variables associated with the plurality of environmental maintenance modules. The recommended modification may result in an optimal change in the cost function.

In some embodiments, the user may provide one or more constraints to the computer. The computer may then determine the recommended modification based on the user-selected constraints to ensure that the recommended modification is within the user-selected constraints.

At step 412, the computer may generate a visual representation of the first set of changes, the second set of changes, and the recommended modification with respect to a predetermined tolerance threshold range. The predetermined tolerance threshold range is a difference between a setpoint and an actual value of a state variable associated with a given environmental maintenance module. According to various embodiments, the first set of changes, the second set of changes, the recommended modification, and the predetermined tolerance threshold range are represented on the visual representation using a plurality of visual cues (e.g. color gradient, transparency of objects, line features).

In some embodiments, the user may provide a selected graphical shape or type to the computer. The computer may then execute the machine learning model using the grouped historic data and the selected graphical shape or type. Accordingly, the selected graphical shape or type may influence the learning/training of the machine learning model. The machine learning model may tailor its learning by prioritizing sections of the historic data that will result in an output including at least one element in the selected graphical shape or type. The computer may then generate the graph including at least one element in the selected graphical shape or type, the graph illustrating the first set of changes, the second set of changes and the recommended modification with respect to the predetermined tolerance threshold range.

At step 414, the computer may output the visual representation to a display device. According to some embodiments, the user may select the recommended modification for implementation. The user may provide this and other input/instruction via a graphical user interface presented to the user on, for example, the display device. The GUI may include the visual representation generated using historic data and including the recommended modification. Alternatively, a controlling system or the computer itself may automatically select the recommended modification for implementation. The computer may then apply the recommended modification to the environmentally controlled space. The recommended modification results in changing the one or more state variables associated with the plurality of environmental maintenance modules in a selected amount by the end of the future time interval. The recommended modification also results in the predicted change in the cost function by the end of the future time interval.

V. Computer System

Figure 5:
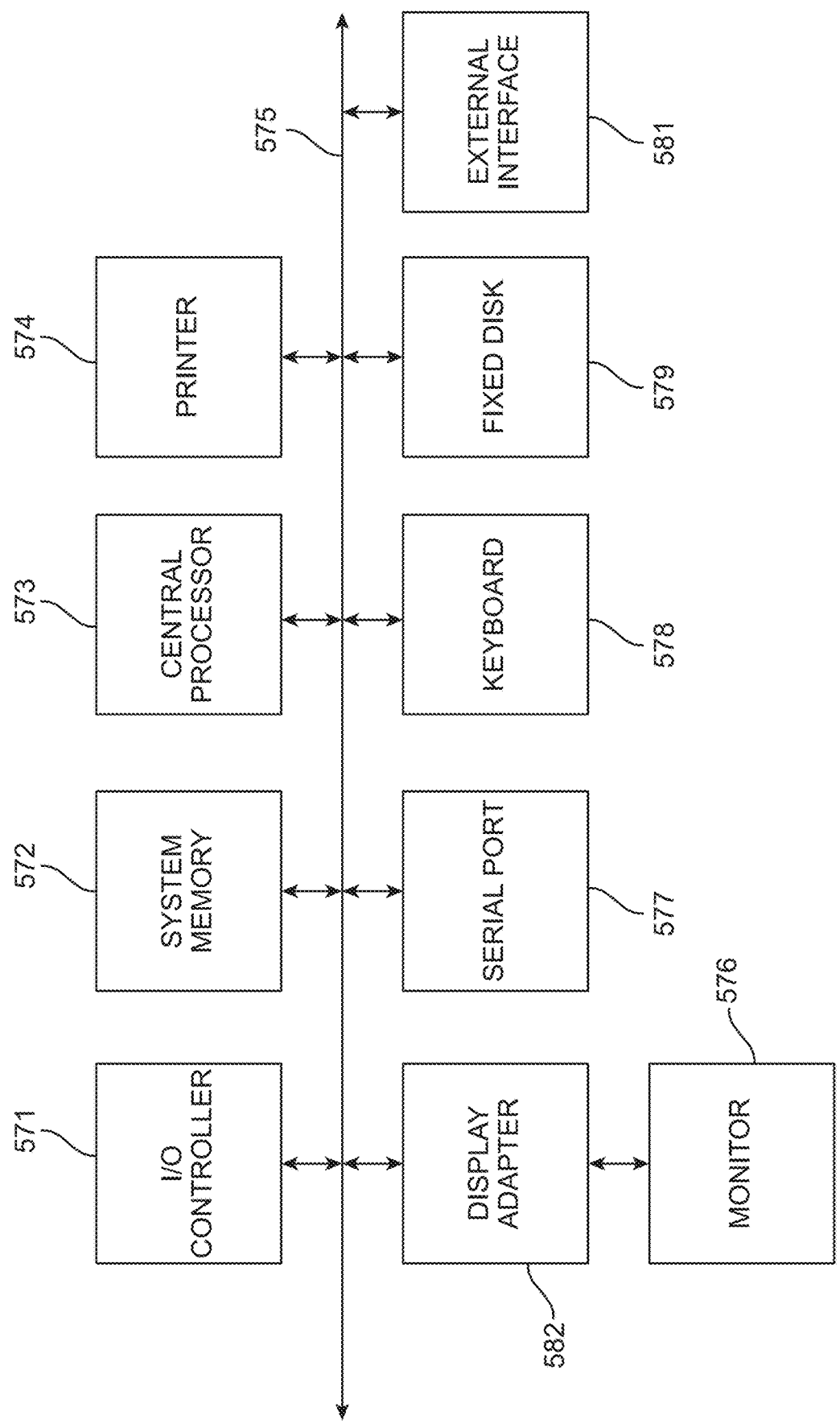
FIG. 5 shows a block diagram of an exemplary computer apparatus usable with systems and methods according to embodiments of the present disclosure.

Any of the computer systems mentioned herein may utilize any suitable number of subsystems. Examples of such subsystems are shown in FIG. 5 in computer apparatus 500. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 5 are interconnected via a system bus 575. Additional subsystems such as a printer 574, keyboard 578, fixed disk 579, monitor 576, which is coupled to display adapter 582, and others are shown. Peripherals and input/output (I/O) devices, which couple to I/O controller 571, can be connected to the computer system by any number of means known in the art, such as serial port 577. For example, serial port 577 or external interface 581 (e.g. Ethernet, Wi-Fi, etc.) can be used to connect computer system 500 to a wide area network such as the Internet, a mouse input device, or a scanner. The interconnection via system bus 575 allows the central processor 573 to communicate with each subsystem and to control the execution of instructions from system memory 572 or the fixed disk 579, as well as the exchange of information between subsystems. The system memory 572 and/or the fixed disk 579 may embody a computer readable medium. Any of the values mentioned herein can be output from one component to another component and can be output to the user.

A computer system can include a plurality of the same components or subsystems, e.g., connected together by external interface 581 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. The computer readable medium may record the data in a non-transitory physical medium. Computer readable media encoded with the program code may be packaged with a compatible device (e.g. computer product) or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including a processor, which can be configured to perform the steps. Thus, embodiments can be directed to computer systems configured to perform the steps of any of the methods described herein, potentially with different components performing a respective steps or a respective group of steps.

Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

All patents, patent applications, publications, and descriptions mentioned above are herein incorporated by reference in their entirety for all purposes. None is admitted to be prior art.

What is claimed is:

1. A method comprising performing by a computer system:
   receiving historic data associated with an environmental controlled space over a period of time, the historic data including data associated with a plurality of environmental maintenance devices provided in the environmentally controlled space or data associated with one or more environmental factors affecting the environmentally controlled space, wherein an environmental maintenance device includes hardware that modifies one or more physical conditions of the environmentally controlled space based at least in part on at least one setpoint of at least one state variable associated with the environmental maintenance device, wherein a change in the at least one setpoint of the environmental maintenance device results in a change in a cost function associated with the plurality of environmental maintenance devices;
   grouping the historic data based on one or more predetermined parameters into grouped historic data;
   executing a machine learning model with a first portion of the grouped historic data, wherein the machine learning model is trained using a second portion of the grouped historic data;
   predicting, based on executing the machine learning model, a first set of changes in one or more state variables associated with the plurality of environmental maintenance devices within a future time interval;
   predicting, based on a first set of changes, a second set of changes in the cost function associated with the plurality of environmental maintenance devices within the future time interval, wherein the second set of changes represent an impact of the first set of changes on the cost function associated with the plurality of environmental maintenance devices within the future time interval;
   determining a first tolerance threshold value associated with the first set of changes and the second set of changes, wherein a tolerance threshold value represent a difference between the at least one setpoint and a value of the at least one state variable associated with the environmental maintenance device;
   identifying, based on executing the machine learning model, one or more recommended modifications in the one or more state variables associated with the plurality of environmental maintenance devices resulting in an optimal change in the cost function associated with the plurality of environmental maintenance devices;
   determining a second tolerance threshold value associated with the one or more recommended modifications, wherein the second tolerance threshold value is higher and less favorable than the first tolerance threshold value, wherein the second tolerance threshold value is within a predetermined tolerance threshold range;
   predicting an impact of the one or more recommended modifications on the cost function associated with the plurality of environmental maintenance devices within the future time interval, wherein the impact of the one or more recommended modifications on the cost function is more favorable than the impact of the first set of changes and the second set of changes on the cost function despite the second tolerance threshold value being higher and less favorable than the first tolerance threshold value;
   generating a visual representation of the first set of changes, the second set of changes, and the one or more recommended modifications with respect to the predetermined tolerance threshold range;
   outputting the visual representation to a display device; and
   modifying the one or more physical conditions of the environmentally controlled space by sending a control signal to one or more of the plurality of environmental maintenance devices to change one or more setpoints based at least in part on the first set of changes, the second set of changes, or the one or more recommended modifications.

2. The method of claim 1, wherein the historic data includes one or more of external air temperature, solar radiation, weather data, a temperature and a static pressure associated with one or more of the plurality of environmental maintenance devices over the period of time.

3. The method of claim 1, further comprising:
   predicting an impact of the first set of changes in the one or more state variables associated with the plurality of environmental maintenance devices on the cost function associated with the plurality of environmental maintenance devices.

4. The method of claim 1, wherein a plurality of setpoints are associated with the environmental maintenance device, wherein the tolerance threshold value represents a difference between the value of the at least one state variable and a setpoint of the plurality of setpoints nearest to the value of the at least one state variable.

5. The method of claim 1, further comprising:
receiving one or more user-selected constraints; and
determining, by the computer system, the one or more recommended modifications within the one or more user-selected constraints.

6. The method of claim 1, further comprising:
receiving the one or more predetermined parameters from a user, wherein the one or more predetermined parameters guide learning of the machine learning model.

7. The method of claim 1, wherein the visual representation includes a graph, the method further comprising:
receiving a selected graphical shape or type from a user, wherein the machine learning model is executed using the grouped historic data and the selected graphical shape or type; and
generating, by the computer system, the graph including at least an element in the selected graphical shape or type, the graph illustrating the first set of changes, the second set of changes and the one or more recommended modifications with respect to the predetermined tolerance threshold range.

8. The method of claim 1, wherein the first set of changes, the second set of changes, the one or more recommended modifications, and the predetermined tolerance threshold range are represented on the visual representation using a plurality of visual cues.

9. The method of claim 1, further comprising:
receiving an instruction to apply the one or more recommended modifications; and
applying the one or more recommended modifications to the environmentally controlled space.

10. A computer product comprising a non-transitory computer readable medium storing a plurality of instructions that, when executed, cause a computer to:
receive historic data associated with an environmental controlled space over a period of time, the historic data including data associated with a plurality of environmental maintenance devices provided in the environmentally controlled space or data associated with one or more environmental factors affecting the environmentally controlled space, wherein an environmental maintenance device includes hardware that modifies one or more physical conditions of the environmentally controlled space based at least in part on at least one setpoint of at least one state variable associated with the environmental maintenance device, wherein a change in the at least one setpoint of the environmental maintenance device results in a change in a cost function associated with the plurality of environmental maintenance devices;
group the historic data based on one or more predetermined parameters into grouped historic data;
execute a machine learning model with a first portion of the grouped historic data, wherein the machine learning model is trained using a second portion of the grouped historic data;
identify, based on executing the machine learning model, a first set of changes in one or more state variables associated with the plurality of environmental maintenance devices within a future time interval;
predict, based on the first set of changes, a second set of changes in cost function associated with the plurality of environmental maintenance devices within the future time interval, wherein the second set of changes represent an impact of the first set of changes on the cost function associated with the plurality of environmental maintenance devices within the future time interval;
determine a first tolerance threshold value associated with the first set of changes and the second set of changes, wherein a tolerance threshold value represents a difference between the at least one setpoint and a value of the at least one state variable associated with the environmental maintenance device;
identify, based on executing the machine learning model, one or more recommended modifications in the one or more state variables associated with the plurality of environmental maintenance devices resulting in an optimal change in the cost function associated with the plurality of environmental maintenance devices;
determine a second tolerance threshold value associated with the one or more recommended modifications, wherein the second tolerance threshold value is higher and less favorable than the first tolerance threshold value, wherein the second tolerance threshold value is within a predetermined tolerance threshold range;
predict an impact of the one or more recommended modifications on the cost function associated with the plurality of environmental maintenance devices within the future time interval, wherein the impact of the one or more recommended modifications on the cost function is more favorable than the impact of the first set of changes and the second set of changes on the cost function despite the second tolerance threshold value being higher and less favorable than the first tolerance threshold value;
generate a visual representation of the first set of changes, the second set of changes, and the one or more recommended modifications with respect to the predetermined tolerance threshold range;
output the visual representation to a display device; and
modify the one or more physical conditions of the environmentally controlled space by sending a control signal to one or more of the plurality of environmental maintenance devices to change one or more setpoints based at least in part on the first set of changes, the second set of changes, or the one or more recommended modifications.

11. The computer product of claim 10, wherein the instructions further cause the computer to:
generate a graphical user interface including the visual representation, wherein the graphical user interface receives an input from a user.

12. The computer product of claim 11, wherein the instructions further cause the computer to:
receive, via the graphical user interface, one or more user-selected constraints; and
determine the one or more recommended modifications within the one or more user-selected constraints.

13. The computer product of claim 11, wherein the instructions further cause the computer to:
receive, via the graphical user interface, an instruction to apply the one or more recommended modifications; and
apply the one or more recommended modifications to the environmentally controlled space.

14. The computer product of claim 10, wherein the instructions further cause the computer to:
receive the one or more predetermined parameters from a user, wherein the one or more predetermined parameters guide learning of the machine learning model.

15. The computer product of claim 10, wherein the visual representation includes a graph, wherein the instructions further cause the computer to:

receive a selected graphical shape or type from a user, wherein the machine learning model is executed using the grouped historic data and the selected graphical shape or type; and generate the graph including at least an element in the selected graphical shape or type, the graph illustrating the first set of changes, the second set of changes and the one or more recommended modifications with respect to the predetermined tolerance threshold range.

16. The computer product of claim 10, wherein the first set of changes, the second set of changes, the one or more recommended modifications, and the predetermined tolerance threshold range are represented on the visual representation using a plurality of visual cues.

17. The computer product of claim 10, wherein the historic data includes one or more of external air temperature, solar radiation, weather data, a temperature, and a static pressure associated with one or more of the plurality of environmental maintenance devices over the period of time.

18. The computer product of claim 10, wherein the instructions further cause the computer to:

predict an impact of the first set of changes in the one or more state variables associated with the plurality of environmental maintenance devices on the cost function associated with the plurality of environmental maintenance devices.

19. The computer product of claim 10, wherein a plurality of setpoints are associated with the environmental maintenance device, wherein the tolerance threshold value represents a difference between the value of the at least one state variable and a setpoint of the plurality of setpoints nearest to the value of the at least one state variable.

20. An environmental maintenance system comprising:

a plurality of environmental maintenance devices;

a computer that is communicatively linked with the plurality of environmental maintenance devices, and the computer product of claim 10, and that is configured to execute the plurality of instructions of the computer product of claim 10; and a display device communicatively linked with the computer for displaying the visual representation generated by the computer.

* * * * *